US012725194B2

(12) United States Patent
Mohite et al.

(10) Patent No.: US 12,725,194 B2
(45) Date of Patent: Sep. 1, 2026

(54) SYSTEM AND METHOD FOR PERSONALIZED RECOMMENDATION AND TRANSACTION OF NON-FUNGIBLE TOKENS OF LIVESTOCK EMBRYOS

(71) Applicant: Tata Consultancy Services Limited, Mumbai (IN)

(72) Inventors: Jayantrao Mohite, Thane (IN); Dineshkumar Jang Bahadur Singh, Thane (IN); Suryakant Ashok Sawant, Pune (IN); Jay Prakash Kumar, Bengaluru (IN); Siddhesh Deepak Nar, Mumbai (IN); Jayshree Dnyaneshwar Kakad, Pune (IN); Srinivasu Pappula, Hyderabad (IN); Vaibhav Sadashiv Lonkar, London (GB)

(73) Assignee: Tata Consultancy Services Limited, Mumbai (IN)

( * ) Notice: Subject to any disclaimer, the term of this patent is extended or adjusted under 35 U.S.C. 154(b) by 67 days.

(21) Appl. No.: 18/901,093

(22) Filed: Sep. 30, 2024

(65) Prior Publication Data

US 2025/0166042 A1 May 22, 2025

(30) Foreign Application Priority Data

Nov. 22, 2023 (IN) ............................ 202321079412

(51) Int. Cl.
*G06Q 30/00* (2023.01)
*G06Q 30/0601* (2023.01)

(52) U.S. Cl.
CPC ..... *G06Q 30/0631* (2013.01); *G06Q 2220/00* (2013.01)

(58) Field of Classification Search
CPC ........................ G06Q 30/0631; G06Q 2220/00
See application file for complete search history.

(56) References Cited

U.S. PATENT DOCUMENTS

2021/0272282 A1* 9/2021 Zaninovic .............. G16H 50/20
2022/0351165 A1* 11/2022 Regenor ................. G06F 21/10

OTHER PUBLICATIONS

Khan PW, Byun YC, Park N. IoT-Blockchain Enabled Optimized Provenance System for Food Industry 4.0 Using Advanced Deep Learning. Sensors (Basel). May 25, 2020;20(10):2990. (Year: 2020).*

(Continued)

*Primary Examiner* — Anand Loharikar
(74) *Attorney, Agent, or Firm* — Finnegan, Henderson, Farabow, Garrett & Dunner, LLP

(57) ABSTRACT

The present disclosure provide a system and method for personalized recommendation and transaction of non-fungible tokens of livestock embryos. There is a challenge in uniquely identifying livestock embryos and tracking them authentically for their ownership and all the associated details about the donor male, female, their lineage and/or the like. The present disclosure leverages blockchain technology to create unique digital assets representing the physical livestock embryos and identified by a unique token. By utilizing smart contracts on a blockchain platform, secure creation, transfer, and ownership tracking of livestock embryo NFTs is enabled. Further, a machine learning based approach for personalized recommendation of the livestock embryos with associated costs to the user based on the available NFT data, domain knowledge about the breeding policy and needs of the user is provided. A marketplace transaction system for fair trading of the livestock embryo NFTs is disclosed.

15 Claims, 4 Drawing Sheets

(56) References Cited

OTHER PUBLICATIONS

Kim et al., "NFTs to MARS: Multi-Attention Recommender System for NFTs," (2023).

* cited by examiner

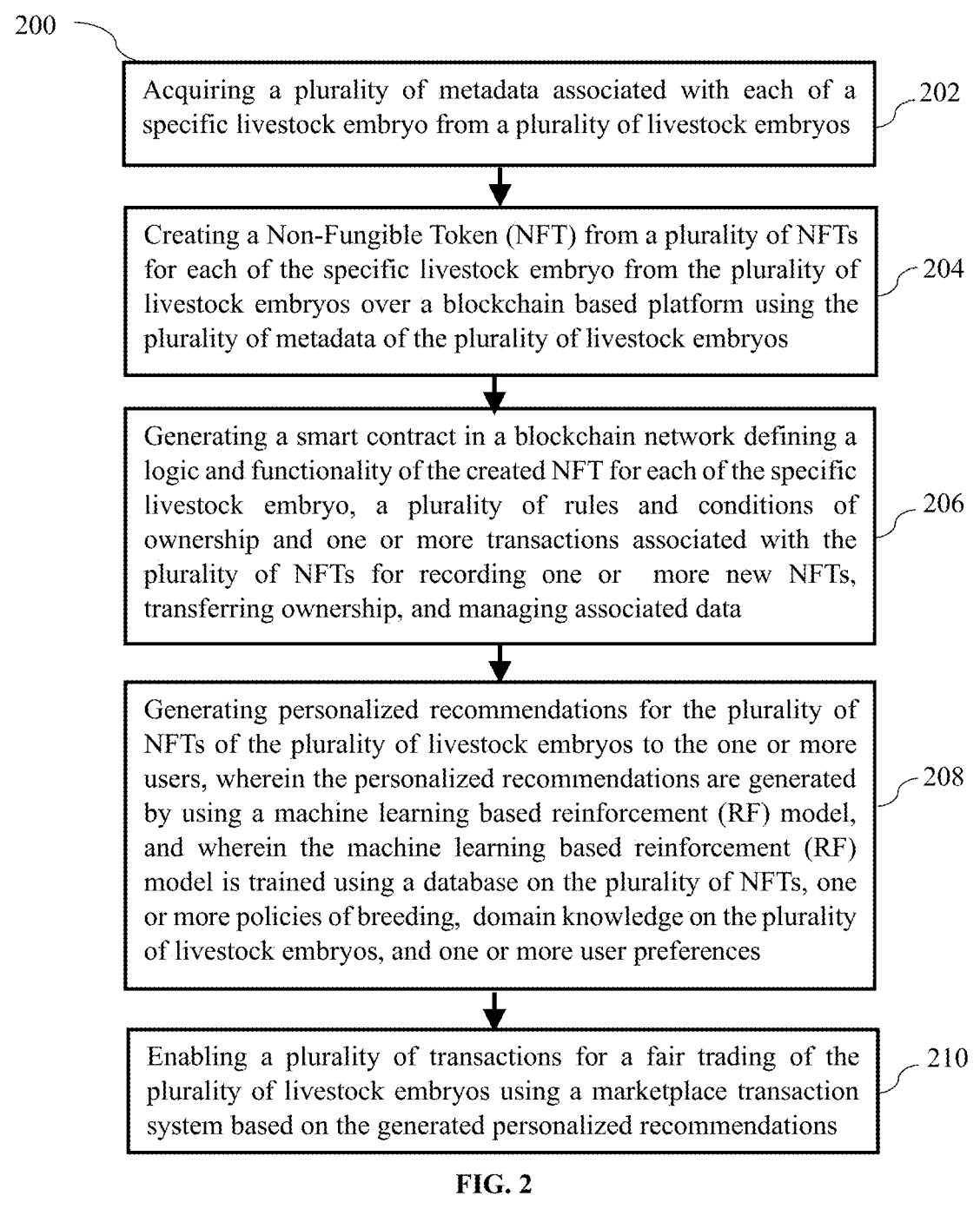

200

Acquiring a plurality of metadata associated with each of a specific livestock embryo from a plurality of livestock embryos — 202

Creating a Non-Fungible Token (NFT) from a plurality of NFTs for each of the specific livestock embryo from the plurality of livestock embryos over a blockchain based platform using the plurality of metadata of the plurality of livestock embryos — 204

Generating a smart contract in a blockchain network defining a logic and functionality of the created NFT for each of the specific livestock embryo, a plurality of rules and conditions of ownership and one or more transactions associated with the plurality of NFTs for recording one or more new NFTs, transferring ownership, and managing associated data — 206

Generating personalized recommendations for the plurality of NFTs of the plurality of livestock embryos to the one or more users, wherein the personalized recommendations are generated by using a machine learning based reinforcement (RF) model, and wherein the machine learning based reinforcement (RF) model is trained using a database on the plurality of NFTs, one or more policies of breeding, domain knowledge on the plurality of livestock embryos, and one or more user preferences — 208

Enabling a plurality of transactions for a fair trading of the plurality of livestock embryos using a marketplace transaction system based on the generated personalized recommendations — 210

FIG. 2

SYSTEM AND METHOD FOR PERSONALIZED RECOMMENDATION AND TRANSACTION OF NON-FUNGIBLE TOKENS OF LIVESTOCK EMBRYOS

PRIORITY CLAIM

This U.S. patent application claims priority under 35 U.S.C. § 119 to: Indian Patent Application number 202321079412, filed on 22 Nov. 2023. The entire contents of the aforementioned application are incorporated herein by reference.

TECHNICAL FIELD

The disclosure herein generally relates to the field of non-fungible tokens, and, more particularly, to system and method for personalized recommendation and transaction of non-fungible tokens of livestock embryos.

BACKGROUND

Blockchain is explored for applications across domains. Digitization of physical assets through concepts such as Non-fungible tokens (NFTs), which are assets that have been tokenized via the blockchain is also well known. NFTs are assigned unique identification codes called tokens and metadata that distinguish them from other tokens in the blockchain. This tokenization can be done for entities like arts, real-estate such as house, cropland, and can only have one official owner at a time. NFTs can be traded i.e., ownership rights are transferred and exchanged for money in the secondary market. They are used in various transactions, including buying, and selling, borrowing, and lending and exchange transactions. A fractional NFT is a single NFT that's been divided into smaller pieces, allowing multiple investors to gain partial ownership of it.

Attempts have been explored for using NFTs to represent agricultural assets or the physical farm assets such as cropland and livestock. Works in literature discuss the potential use of blockchain-based solutions to address issues such as access to credit, transparency in transactions, and the creation of secure and reliable payment systems by representing cropland or agriculture land as NFTs. In context of livestock Embryo Transfer (ET), blockchain-based solutions are still in progress to be explored. Conventionally embryo transfer process is offline and happens one to one between a farmer and a laboratory. Livestock embryo transfer is challenging due to mass production, distribution and implementation. One of the reasons is lack of an easily accessible, reliable, and transparent online platform or system for identification and tracking of these Embryos. This increases the risk of fraud, manipulation and dispute regarding the lineage of the breed. In some cases, there is chance that, dummy or counterfeit embryos are being transferred. In such cases, there is heavy loss to the farmer as the cost involved in ET is very high compared to traditional artificial insemination.

SUMMARY

Embodiments of the present disclosure present technological improvements as solutions to one or more of the above-mentioned technical problems recognized by the inventors in conventional systems. For example, in one embodiment, a processor implemented method is provided. The processor implemented method, comprising acquiring, via one or more hardware processors, a plurality of metadata associated with each of a specific livestock embryo from a plurality of livestock embryos; creating, via one or more hardware processors, a Non-Fungible Token (NFT) from a plurality of NFTs for each of the specific livestock embryo from the plurality of livestock embryos over a blockchain based platform using the plurality of metadata of the plurality of livestock embryos; generating, via the one or more hardware processors, a smart contract in a blockchain network defining a logic and functionality of the created NFT for each of the specific livestock embryo, a plurality of rules and conditions of ownership and one or more transactions associated with the plurality of NFTs for recording one or more new NFTs, transferring ownership, and managing associated data; generating, via the one or more hardware processors, personalized recommendations for the plurality of NFTs of the plurality of livestock embryos to the one or more users, wherein the personalized recommendations are generated by using a machine learning based reinforcement (RF) model, and wherein the machine learning based reinforcement (RF) model is trained using a database on the plurality of NFTs, one or more policies of breeding, a domain knowledge on the plurality of livestock embryos, and one or more user preferences; and enabling, via the one or more hardware processors, a plurality of transactions for a fair trading of the plurality of livestock embryos using a marketplace transaction system based on the generated personalized recommendations.

In another aspect, a system is provided. The system comprising a memory storing instructions; one or more communication interfaces; and one or more hardware processors coupled to the memory via the one or more communication interfaces, wherein the one or more hardware processors are configured by the instructions to: acquire a plurality of metadata associated with each of a specific livestock embryo from a plurality of livestock embryos; create a Non-Fungible Token (NFT) from a plurality of NFTs for each of the specific livestock embryo from the plurality of livestock embryos over a blockchain based platform using the plurality of metadata of the plurality of livestock embryos; generate a smart contract in a blockchain network defining a logic and functionality of the created NFT for each of the specific livestock embryo, a plurality of rules and conditions of ownership and one or more transactions associated with the plurality of NFTs for recording one or more new NFTs, transferring ownership, and managing associated data; generate personalized recommendations for the plurality of NFTs of the plurality of livestock embryos to the one or more users, wherein the personalized recommendations are generated by using a machine learning based reinforcement learning (RF) model, and wherein the machine learning based reinforcement learning (RF) model is trained using a database on the plurality of NFTs, one or more policies of breeding, a domain knowledge on the plurality of livestock embryos, and one or more user preferences; and enable a plurality of transactions for a fair trading of the plurality of livestock embryos using a marketplace transaction system based on the generated personalized recommendations.

In yet another aspect, a non-transitory computer readable medium is provided. The non-transitory computer readable medium are configured by instructions for acquiring, a plurality of metadata associated with each of a specific livestock embryo from a plurality of livestock embryos; creating, a Non-Fungible Token (NFT) from a plurality of NFTs for each of the specific livestock embryo from the plurality of livestock embryos over a blockchain based platform using the plurality of metadata of the plurality of livestock embryos; generating, a smart contract in a blockchain network defining a logic and functionality of the created NFT for each of the specific livestock embryo, a plurality of rules and conditions of ownership and one or more transactions associated with the plurality of NFTs for recording one or more new NFTs, transferring ownership, and managing associated data; generating, personalized recommendations for the plurality of NFTs of the plurality of livestock embryos to the one or more users, wherein the personalized recommendations are generated by using a machine learning based reinforcement (RF) model, and wherein the machine learning based reinforcement (RF) model is trained using a database on the plurality of NFTs, one or more policies of breeding, a domain knowledge on the plurality of livestock embryos, and one or more user preferences; and enabling, a plurality of transactions for a fair trading of the plurality of livestock embryos using a marketplace transaction system based on the generated personalized recommendations.

In accordance with an embodiment of the present disclosure, the generated smart contract ensures security, authenticity, and enforceability of the plurality of NFTs on the blockchain network.

In accordance with an embodiment of the present disclosure, the machine learning based reinforcement learning (RF) model generates personalized recommendations by: predicting a breeding outcomes for each available livestock embryo from the plurality of livestock embryos; assigning a rank to each available livestock embryo from the plurality of livestock embryos based on the predicted breeding outcomes with most favorable livestock embryos given higher rankings; and generating personalized recommendations for the plurality of livestock embryos based on the rank.

In accordance with an embodiment of the present disclosure, the plurality of transactions enabled by the marketplace transaction system for the plurality of livestock embryos include at least one of (i) an auction, (ii) exchange of the plurality of livestock embryos, (iii) consignment sales, (iv) future contracts, and (v) options contracts.

In accordance with an embodiment of the present disclosure, the plurality of transactions enabled by the marketplace transaction system for the plurality of livestock embryos ensure (i) flexibility due to preservation of the plurality of livestock embryos for longer duration using cryogenics process, and (ii) matchmaking for selling to include one or more schemes and constrained selling.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 illustrates an exemplary flow diagram illustrating a method for personalized recommendation and transaction of non-fungible tokens of livestock embryos, in accordance with some embodiments of the present disclosure.

DETAILED DESCRIPTION

Figure 1:
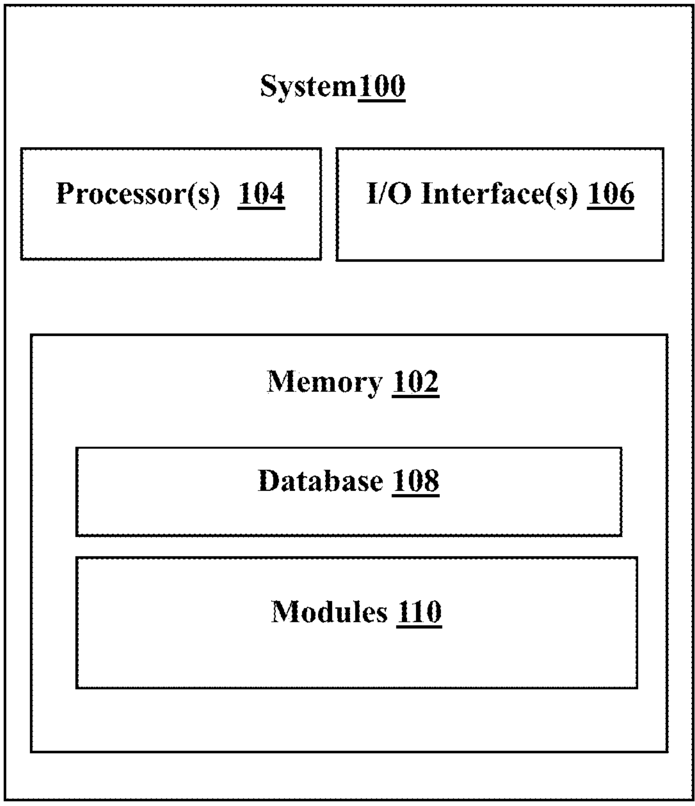
FIG. 1 illustrates an exemplary system for personalized recommendation and transaction of non-fungible tokens of livestock embryos, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

There is a challenge in uniquely identifying livestock embryos and tracking them authentically for their ownership and all the associated details about the donor male, female, their lineage and/or the like. In the context of livestock, embryos typically refer to the fertilized eggs of animals such as cattle, buffalo, sheep or goat, and/or the like. There are certain stages for development of embryos and their transfer such as Superovulation, Artificial Insemination (AI), Embryo Collection, Embryo Evaluation and Embryo Transfer (ET). In addition to fresh embryo transfers, embryos can also be cryopreserved (frozen) for later use. This allows for long-term storage and transport of embryos, making it possible to exchange genetic material between different locations and over extended periods of time. Such an approach is especially useful in the case of animals which are in high demand for their genetic potential to give better and more yield of milk and meat, or those species which face a very high risk of extinction. The use of livestock embryos offers several advantages in animal breeding, including the ability to propagate desirable genetic traits, preserve rare or endangered breeds, control diseases, increase reproductive efficiency, and facilitate international trade in genetic material. While there are various advantages of embryos and embryo transfer (ET), those are being developed and transferred at individual level. Its mass production, distribution and implementation are still missing due to various reasons. One of the reasons is the lack of an easily accessible, reliable, and transparent online platform or system for identification and tracking of these Embryos.

Further, in the ET process, a farmer who would like to do the ET approaches a laboratory which stores embryos and performs the ET. Farmer provides basic data in terms of cattle breed, region, and/or the like and based on a regional breeding policy, lab-experts suggest an embryo and further process of Embryo Transfer is carried out. All this process is offline and happens one to one between farmer and ET laboratory. Thus, there is no method or system which recommends farmers about various embryo options with associated benefits. Moreover, there is no marketplace transaction system available for embryo trading.

Embodiments of the present disclosure provide a system and method for personalized recommendation and transaction of non-fungible tokens of livestock embryos. In the context of present disclosure, the expressions 'livestock embryos' and 'embryos' can be interchangeably used throughout the description. Further, the expressions 'livestock' and 'animals' can be interchangeably used throughout the description The key idea is to leverage blockchain technology to create unique digital assets representing the physical livestock embryos and identified by a unique token. By utilizing smart contracts on a suitable blockchain platform, such as Ethereum or others, the system of the present disclosure enables secure creation, transfer, and ownership tracking of Livestock Embryo NFTs. These NFTs are associated with comprehensive metadata, including genetic traits, health records of the donor parents (animals), and other relevant information such as storage environment, movement, facilitating transparency and enhancing the value of livestock genetic resources. More specifically, the present disclosure describes the following:

1. A NFT based system to track the livestock embryos, their ownership and all the associated historical and current metadata which helps from traceability perspective, and in avoiding frauds and manipulations.
2. An Artificial Intelligence and machine learning based approach for personalized recommendation of the livestock embryos with associated costs to the farmers or other stakeholders based on the available NFT data, domain knowledge about the breeding policy and needs of the farmer or stakeholders.
3. A marketplace platform for trading livestock embryos which could be used by all the stakeholders such as farmers and laboratories for buying and selling livestock embryos. As livestock embryos can be stored for later use, there can be transactions such as future options.

Referring now to the drawings, and more particularly to FIG. 1 through 4, where similar reference characters denote corresponding features consistently throughout the figures, there are shown preferred embodiments and these embodiments are described in the context of the following exemplary system and/or method.

FIG. 1 illustrates an exemplary system for personalized recommendation and transaction of non-fungible tokens of livestock embryos, according to some embodiments of the present disclosure.

Figure 3:
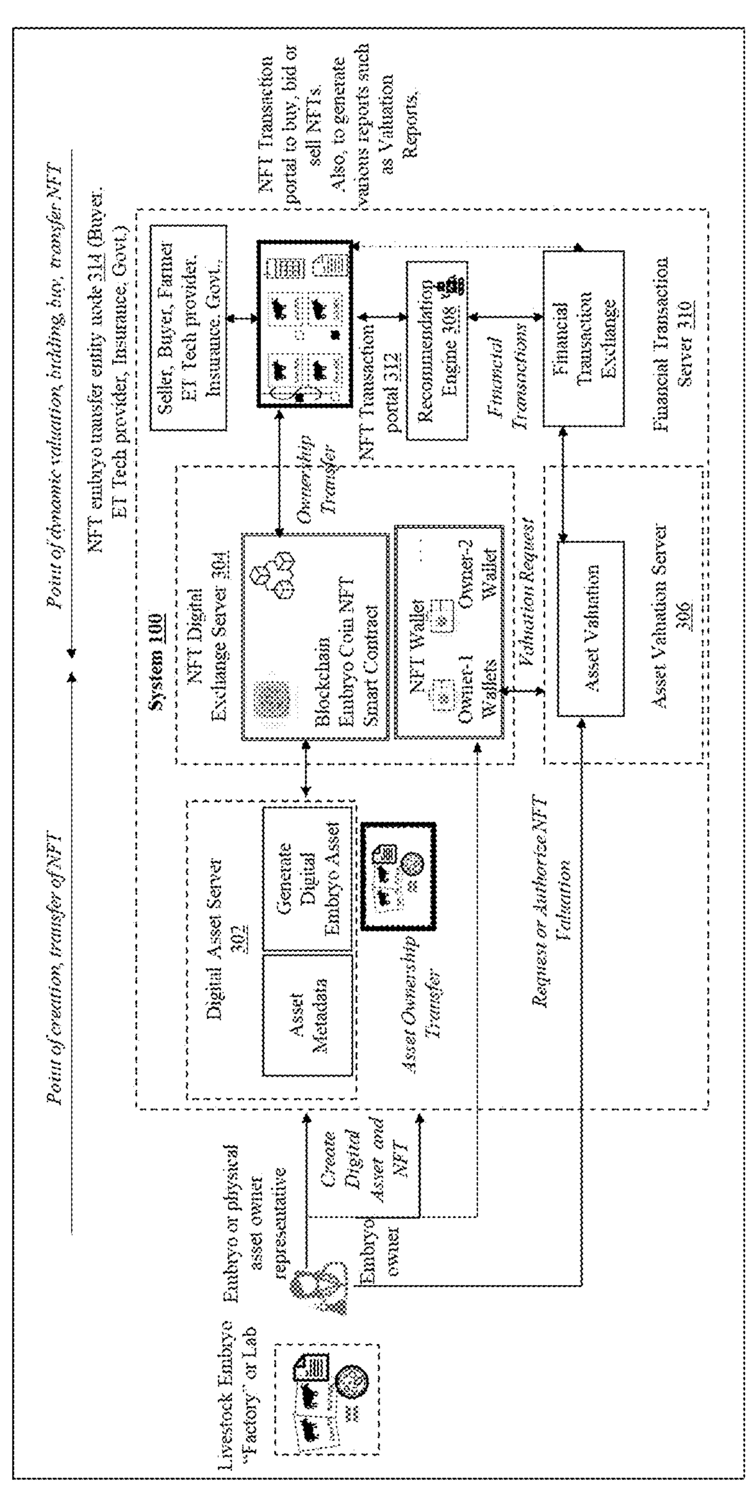
FIG. 3 illustrates a high-level functional architectural overview of the system of FIG. 1, in accordance with some embodiments of the present disclosure.

In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism. As depicted in FIG. 3, the overall architecture of the system 100 comprises components such as a digital embryo asset server 302, a NFT digital exchange server 304, an asset valuation server 306, a recommendation engine 308, a financial transaction server 310, a Marketplace transaction system or a NFT Transaction portal 312, and an NFT embryo transfer entity node 314 which communicate with each other through the I/O interfaces 106. The NFT embryo transfer entity node 314 enables stakeholders to transact the available Embryo NFTs. The NFT transaction portal 312 (through mobile applications, or web applications, or through application program interfaces (APIs)) provide the stakeholders of the NFT embryo transfer entity node 314 to provide their desired input criteria to search for an appropriate NFT and accordingly select one desired NFT (or more than one NFT) out of available NFTs and then either buy it by making the full payment or can join an ongoing auction and bid for them. The auction winners are notified and then they can make the full payment and get the ownership of the NFT. As well understood for person skilled in the art, the components of the system may be physically distributed within the environment of system 100 and can be implemented in cloud servers of a cloud environment.

The system 100, with one or more hardware processors present across the physically distributed components, is configured to execute functions of one or more functional blocks or components (servers) of the system 100. In an embodiment, the servers may be used to process requests and send responses, to execute an algorithm for agricultural credit eligibility, automatic credit disbursement schedule, and/or the like.

Referring to the components of system 100, in an embodiment, the I/O interface(s) 106 may include a variety of software and hardware interfaces, for example, a web interface, a graphical user interface, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 can include one or more ports for connecting to a number of external devices or to another server or devices. As depicted in the architecture of system 100 of FIG. 3, the external devices can include Global Positioning System (GPS) enabled mobile devices with sensing, processing, communicating, displaying and storage capability, external third party data sources for various types of information associated with the plurality of livestock and a plurality of farmers, information on factory or laboratory set up for livestock embryo transfer.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110 distributed across each of the distributed components (servers). The plurality of modules 110 include programs or coded instructions that supplement applications or functions performed by the components of system 100 for executing different steps involved in the process of providing personalized recommendations for the plurality of livestock embryos to the one or more users using Non-fungible tokens (NFTs) of the plurality of livestock embryos, and enabling a plurality of transactions using a marketplace transaction system, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure. Further, the memory 102 includes a database 108, which can be a distributed storage for each of the components such as servers depicted in FIG. 3. The database (or repository) 108 may include a plurality of abstracted pieces of code for refinement and data that is processed, received, or generated as a result of the execution of the plurality of modules in the module(s) 110. The database stores information pertaining to metadata details of the livestock embryo which includes the details of the male and female donor animals, satellite data, weather data, on-field sensors data, digital data of the livestock embryo transfer, NFTs created for the livestock embryos and associated metadata of the NFTs, and the like.

Further, the NFT digital exchange server 304 within the system 100 includes the blockchain network having the smart contracts and a distributed ledger recording the transaction of assets (herein NFTs).

Although the database 108 is shown internal to the system 100, it will be noted that, in alternate embodiments, the database 108 can also be implemented external to the system 100, and communicatively coupled to the system 100. The data contained within such an external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS) or any non-relational database such as NoSQL or document databases. Functions of the components of the system 100 are now explained with reference to architecture as depicted in steps in flow diagrams in FIG. 2 and FIG. 3.

FIG. 2, with reference to FIG. 1, illustrates an exemplary flow diagram illustrating a method 200 for personalized recommendation and transaction of non-fungible tokens of livestock embryos, using the system 100 of FIG. 1, in accordance with some embodiments of the present disclosure. Referring to FIG. 1, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the flow diagram as depicted in FIG. 2, and one or more examples. Although steps of the method 200 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

Referring to FIG. 2, at step 202 of the present disclosure, one or more hardware processors are configured to acquire a plurality of metadata associated with each of a specific livestock embryo from a plurality of livestock embryos. In an embodiment, the plurality of metadata may comprise but not limited to genetic traits, health records, breeding history, pedigree information, one or more characteristics, certification and authenticity information, ownership history, seller information, cost and pricing information, and media and visual representations. The genetic traits may refer but not limited to information about species, breed, their age at the time of donation and traits of the embryo such as specific gene markers, hereditary characteristics, or desired traits like milk production, growth rate, disease resistance, coat color, and/or the like. The health records may include but are not limited to vaccination history, disease testing results, health assessments, or any relevant medical information about the embryo. The breeding history may include but are not limited to historical data on breeding outcomes associated with the embryo, including its milk yield and number of lactations (in case of female donor), reproductive success rates, conception rates, pregnancy rates, or any past breeding performance records. The pedigree information may include but are not limited to ancestry and lineage details of the embryo including information about its parents, grandparents, and other relevant ancestors, which can help assess genetic potential and value of the embryo. The one or more characteristics may include but are not limited to information about age or developmental stage of the embryo physical attributes or specific characteristics that are relevant to its quality or value, donor's location, climatic zone, date and time of extraction of donated eggs or semen, and/or the like. The certification and authenticity information includes documentation or certifications from reputable organizations or breed associations that verify the authenticity and quality of the embryo, ensuring its legitimacy and accurate representation. The ownership history may include details of the ownership over life of animals, their nutrient details, an overview of the ownership history or chain of custody for the embryo, documenting its previous owners and transactions, providing transparency and provenance information. The seller information may include details about the seller of the embryo such as their identity, contact information, and reputation within the marketplace, allowing potential buyers to assess the credibility and reliability of the seller. The cost and pricing information refers to associated cost or pricing details of the embryo, including current asking price, any additional fees or charges, or pricing history if available. The media and visual representations include images or videos showcasing the embryo, including ultrasound images, photographs, or other visual representations that highlight its quality and potential.

Figure 4:
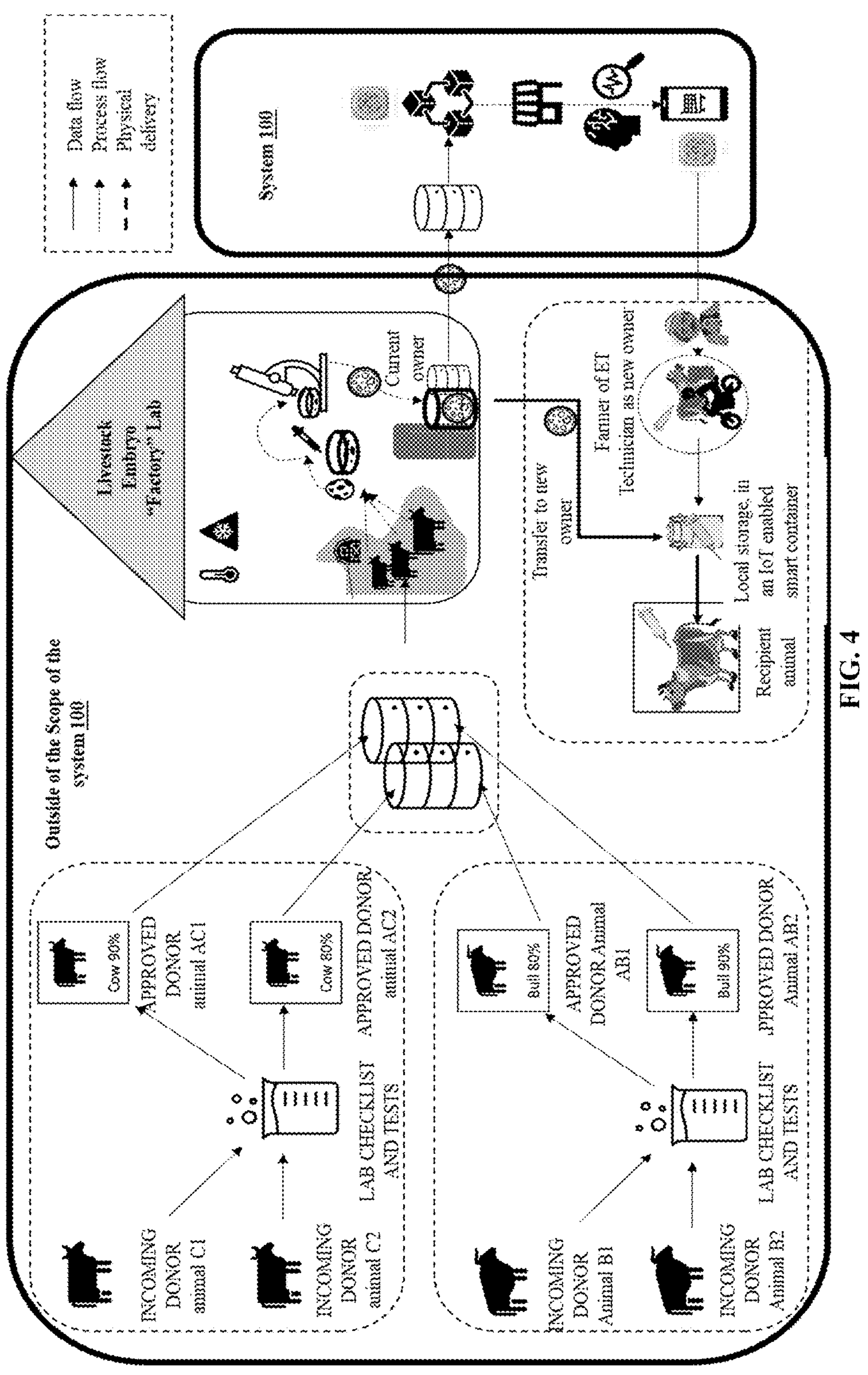
FIG. 4 illustrates a high-level diagram of an embryo creation and physical to digital transformation process flow, in accordance with some embodiments of the present disclosure.

FIG. 3 illustrates a high-level functional architectural overview of the system of FIG. 1, in accordance with some embodiments of the present disclosure. As shown in FIG. 3, a digital livestock embryo asset is created using the plurality of metadata associated with each of the specific livestock embryos from a plurality of livestock embryos. A central database captures the plurality of metadata which also includes details of male and female donor animals. FIG. 4 illustrates a high-level diagram of an embryo creation and physical to digital transformation process flow, in accordance with some embodiments of the present disclosure. In other words, FIG. 4 describes the embryo creation process and how embryo physical information can be converted into a digital record which can used to track and trace the physical embryo. The information associated with embryo creation can also be provided by a user interface (UI) to allow users to interact with the system 100. The UI provides the plurality of metadata to create digital livestock embryos, creating new Livestock Embryo NFTs, viewing and selecting metadata, initiating transactions, and managing ownership. This enhances the end user experience.

With reference architecture of the system 100 depicted in FIG. 3, the digital embryo asset server 302 generates an equivalent digital replica of a livestock embryo based on the plurality of metadata. This helps to give digital, transparent, and trackable view of the physical embryo. Also, it helps in generating a potential embryo performance score by an intelligent engine in terms of potential success of confirmed pregnancy, potential health score (out of 10) of the offspring, potential milk yield per year, and/or the like.

In an embodiment, at step 204 of the present disclosure, the one or more hardware processors are configured to create a Non-Fungible Token (NFT) from a plurality of NFTs for each of the specific livestock embryo from the plurality of livestock embryos over a blockchain based platform using the plurality of metadata. In an embodiment an Ethereum or other blockchain technology based blockchain platform that supports NFT creation, and a smart contract functionality may be used. The plurality of NFTs are associated with the plurality of metadata, facilitating transparency and enhancing value of livestock genetic resources. The ownership, all the associated metadata and transactions are maintained over distributed ledger co-maintained by all stakeholders. The access to NFT infrastructure is shared with all the stakeholders as per defined rules and requirements. Moreover, a verification mechanism for the plurality of NFTs and transactions recorded are co-maintained by all the stakeholders.

As shown in FIG. 3, the NFT digital exchange server 304 uses the information generated by the digital embryo asset server 302 to create the NFT for the for each of the specific livestock embryo from the plurality of livestock embryos. The NFT for each of the specific livestock embryo from the plurality of livestock embryos are created in a distributed ledger-based blockchain network where smart contract for each NFT includes the plurality of metadata and other details associated with terms of usage, thresholds, conditions, and/or the like. The NFT for each of the specific livestock embryo from the plurality of livestock embryos are used to uniquely identify each of the specific livestock embryo using the distributed ledger-based blockchain network. The NFT digital exchange server 304 would have virtual wallet for each entity or stakeholders such as farmer, embryo generating labs or service providers. These NFTs are allocated to a virtual farmer or owner wallet (i.e., individual farmer accounts) post creation for the easy grouping and group-based transactions. This wallet can have all the associated embryo NFTs owned by them respectively. This helps in easy management of the plurality of NFTs. Each NFT can be transferred to another entity and the details of such ownership transfer can be seen at any time. In case of a physical embryo is discarded, for any reasons such as wastage, or damage, then associated embryo NFT status are marked as inactive and accordingly cannot be transacted further. If the embryos are used in an animal, then the associated embryo NFT is marked as consumed and cannot be used or transacted further. But in all such scenarios, the historical data can be seen at any time.

In an embodiment, the digital livestock embryo asset are registered by an embryo or physical asset owner representative into the digital asset server 302 in may be text, images and video in digital form, paper documents later scanned into the system 100. The embryo or physical asset owner representative herein refers to an authorized agent for the embryo owner, in capacity to communicate with the system 100 for registering the plurality of livestock embryos or communicating with the system 100 for actions associated with the NFTed assets corresponding to the plurality of livestock embryos.

At step 206 of the present disclosure, the one or more hardware processors are configured to generate a smart contract in a blockchain network defining a logic and functionality of the created NFT for each of the specific livestock embryo, a plurality of rules and conditions of ownership and one or more transactions associated with the plurality of NFTs for recording one or more new NFTs, transferring ownership, and managing associated data. defines the logic and functionality of the Livestock Embryo NFTs. In other words, the generated smart contract handles tasks such as minting new NFTs, transferring ownership, and managing associated data. The generated smart contract ensures security, authenticity, and enforceability of the plurality of NFTs on the blockchain network.

With reference to architecture diagram of the system 100 as shown in FIG. 3, the asset valuation server 306 is an intelligent NFT valuation server which dynamically evaluates the economic value of the associated NFTs. It uses multiple parameters such as potential performance of the embryos, their current and historical storage environment details, rarity of the embryos and the number of availability of such embryos, and the transaction trend of the associated similar NFTs in last one year. This helps in appropriately determining the price of the NFT in a given currency and hence value of the NFT is determined and published on the financial transaction server 310. where the equivalent monetary transactions are recorded, and which can be linked or extended to regional, or government regulated monetary exchanges.

Further, at step 208 of the present disclosure, the one or more hardware processors are configured to generate personalized recommendations for the plurality of NFTs for the plurality of livestock embryos to the one or more users. The personalized recommendations are generated by using a machine learning based reinforcement learning (RF) model. The machine learning based reinforcement (RF) model is trained using a dataset on the plurality of NFTs, one or more policies of breeding, a domain knowledge on the plurality of livestock embryos, and one or more user preferences. The one or more user preferences may include personalized preferences or expectations received from users such as the farmer where the personalized preferences or expectations may include but are not limited to desired genetic traits (specific genetic traits or characteristics that the farmer is seeking in the offspring, such as high milk production, superior growth, or disease resistance), breeding goals (overall breeding objectives and priorities of the farmer, considering factors like breed improvement, preservation of genetic diversity, or achieving specific production targets), budgetary constraints, and/or the like. The machine learning based reinforcement learning (RF) model generates personalized recommendations by first predicting a breeding outcomes for each available livestock embryo from the plurality of livestock embryos. Further, a rank is assigned to each available livestock embryo from the plurality of livestock embryos based on the predicted breeding outcomes with most favorable livestock embryos given higher rankings. Furthermore, the personalized recommendations for the plurality of livestock embryos based on the rank.

The step 204 is better understood by way of the following description provided as exemplary explanation.

The machine learning based RF model is trained using the dataset (i.e., training dataset), with a plurality of input features defined as embryo characteristics (e.g., genetic traits, health records) and a target variable defined as breeding outcomes. The performance of the trained model is evaluated using a testing dataset by calculating relevant evaluation metrics such as accuracy, precision, recall, and F1 score. Finalized machine learning based RF model is used to generate personalized recommendations for the plurality of livestock embryos. Current user preferences and available embryos are obtained as input data. The features in the input data are preprocessed using encoding methods. The finalized machine learning based RF model is applied to predict the breeding outcomes for each available embryo as shown in expressions (1) and (2) below:

$$\text{Breeding Outcomes} = f\,(\text{embryo characteristics}) \tag{1}$$

$$\text{embryo characteristics} = f\,(\textit{maleDonorCharacteristics},\ \textit{femaleDonorCharacteristics}) \tag{2}$$

The embryos are ranked based on the predicted breeding outcomes, with the most favorable embryos given higher rankings. The ranked list of embryos, starting with the most favorable, is provided as recommendations to the user. These recommendations are based on the predicted breeding outcomes generated by the machine learning based RF model as shown in expression (3) below:

$$\textit{RecEmbryoList} = f\,(\text{Breeding outcomes, farmer preferences, Embryo NFTs}) \tag{3}$$

The user could utilize this list to make informed decisions on embryo selection, considering the potential breeding outcomes associated with each recommended embryo. The system of the present disclosure takes into account feedback on success or failure of previous recommendations, can learn and adapt its recommendations to maximize desired breeding outcomes for users.

In an embodiment, step 204 is further better understood by way of the following working example provided as exemplary explanation.

For instance, raw data extracted from the NFT based system about 10 embryo's in is provided in Table 1 below:

TABLE 1

| Embryo | Trait A | Trait B | Trait C | Vaccination | Disease Resistance | Health | Breed type | Legal restriction |
|---|---|---|---|---|---|---|---|---|
| 1 | 7 | 8 | 6 | 1 | 9 | 8 | Cattle | 1 |
| 2 | 8 | 6 | 5 | 1 | 8 | 7 | Cattle | 0 |
| 3 | 6 | 9 | 7 | 1 | 10 | 9 | Sheep | 0 |
| 4 | 9 | 7 | 6 | 1 | 9 | 8 | Cattle | 1 |
| 5 | 7 | 6 | 8 | 1 | 8 | 7 | Cattle | 0 |
| 6 | 6 | 8 | 9 | 1 | 9 | 8 | Sheep | 1 |
| 7 | 8 | 7 | 6 | 1 | 9 | 8 | Cattle | 1 |
| 8 | 7 | 6 | 7 | 1 | 8 | 7 | Cattle | 0 |
| 9 | 5 | 7 | 6 | 1 | 7 | 6 | Sheep | 0 |
| 10 | 8 | 6 | 7 | 1 | 9 | 8 | Cattle | 1 |

For the data provided in Table 1, it is assumed that regression models for each breeding outcome (i.e., milking capacity, beef production, and reproductive capacity) is provided. This model considers all the embryo related parameters, domain knowledge and regional breeding policy and provides scores for milking capacity, beef production, and reproductive capacity. Output of this model is provided in Table 2 below where each embryo has scores between 0-1 for each of the breeding outcomes.

TABLE 2

| Embryo | Milking Score | Beef Score | Reproductive Score |
|---|---|---|---|
| 1 | 0.7 | 0.6 | 0.8 |
| 2 | 0.6 | 0.5 | 0.7 |
| 3 | 0.5 | 0.4 | 0.9 |
| 4 | 0.8 | 0.7 | 0.8 |
| 5 | 0.6 | 0.5 | 0.6 |
| 6 | 0.7 | 0.4 | 0.9 |
| 7 | 0.6 | 0.6 | 0.7 |
| 8 | 0.7 | 0.5 | 0.8 |
| 9 | 0.4 | 0.3 | 0.6 |
| 10 | 0.8 | 0.7 | 0.8 |

Further, milking scores are adjusted depending upon farmers expectations and inputs regarding their cattle and surrounding environment. For example, in the information about the farmer expectation, it is assumed that he expects an embryo with high milking capacity. Input regarding the farmer's cattle and surrounding environment are provided in Table 3 and Table 4 respectively.

TABLE 3

| Parameter | Value |
|---|---|
| Average Milking (litre/day) | 20 |
| Daily Feed Amount (kg/day) | 5 |

TABLE 4

| Location | Temperature (C.) | Humidity (%) |
|---|---|---|
| Farm 1 | 28 | 60 |
| Farm 2 | 25 | 65 |
| Farm 3 | 30 | 55 |

Since the farmer expectation is high milk capacity, there is a need to modify milking score which is an indicator for milking capacity. Thus, the modified milking score is obtained in accordance with expressions (4) and (5) below:

$$\text{Modified Milking Score} = f(\text{Original Milking Score, average milking, daily feed, average temperature, average humidity}) \quad (4)$$

$$\text{Modified Milking Score} = \text{Original Milking Score} * (\text{Avg Milking}/20) * (\text{Daily Feed}/5) * (1 - (\text{Temperature} - 20)/10) * (1 - (\text{Humidity} - 50)/30) \quad (5)$$

The specific values used in the above expression (20 for average milking, 5 for daily feed, 20° C. for temperature, and 50% for humidity) might vary based on real-world data, region and expert knowledge and changes over time. The milking capacity of cattle could be influenced by their average milking and daily feed intake. Cattle with higher milking averages and appropriate feed intake might have better milking capacities. Also, cattle's milking capacity might be affected by the temperature of their environment. Cattle might produce less milk in extreme temperatures. The adjustment factor reduces the milking score if the temperature is significantly different from an optimal value (e.g., 20° C.). Humidity can also impact cattle's milking capacity. High humidity might stress cattle, affecting their milk production. The adjustment factor reduces the milking score if the humidity is significantly different from an optimal value (e.g., 50%).

Based on the modified milking scores that take into account the farmer's cattle parameters and environmental factors, the recommendation engine can provide a list of embryos ranked by their suitability for high milking capacity as shown in Table 5, considering the surrounding environment and cattle conditions.

TABLE 5

| Embryo | Modified Milking score | Rank |
|---|---|---|
| 1 | 0.71733 | 2 |
| 2 | 0.624 | 6 |
| 3 | 0.49466 | 10 |
| 4 | 0.78266 | 1 |
| 5 | 0.624 | 6 |
| 6 | 0.68266 | 4 |
| 7 | 0.69333 | 3 |
| 8 | 0.65133 | 5 |
| 9 | 0.304 | 9 |
| 10 | 0.77866 | 1 |

It is observed from Table 5 that Embryo 4 and Embryo 10 have the highest modified scores and could be the most suitable options.

In an embodiment, at step 210 of the present disclosure, the one or more hardware processors 104 are configured by the instruction to enable a plurality of transactions for a fair trading of the plurality of livestock embryos using a marketplace transaction system based on the generated personalized recommendations. The plurality of transactions enabled by the marketplace transaction system for the plurality of livestock embryos include at least one of (i) an auction, (ii) exchange of the plurality of livestock embryos, (iii) consignment sales, (iv) future contracts, and (v) options contracts. The plurality of transactions enabled by the marketplace transaction system for the plurality of livestock embryos ensure (i) flexibility due to preservation of the plurality of livestock embryos for longer duration using cryogenics process, and (ii) matchmaking for selling to include one or more schemes such as financial assistance to preserve local breeds, and constrained selling.

With the marketplace transaction system 312, buyers and sellers can seamlessly engage in buying and selling transactions facilitated by the NFT system. The marketplace transaction system is available to all the stakeholders such as farmers, breeders and breeding organizations. Users register in the marketplace transaction system, providing necessary information such as their name, contact details, location, and payment preferences. The marketplace transaction system offers a user-friendly interface where buyers can search for embryo NFTs based on their preferences, view detailed listings, and compare different options. Utilizing the available data within the NFT system, buyers can easily select the most suitable embryo NFTs based on genetic traits, health records, and costs. Once buyers express their intent to purchase specific embryo NFTs, the transaction process commences, including price negotiation if desired, payment verification, and ownership transfer of the embryo NFTs. Farmers are able to see the generated personalized recommendations for the plurality of NFTs (i.e., embryo NFT) for the plurality of livestock embryos with their associated price and relevant information. Farmers can put the request for buying of the embryo NFT and purchase the same if there are not any other buyers for the same NFT. If the number of buyers is more than 1, then auction or bidding transactions take place. As soon as the transaction is completed, money gets credited to the sellers account and NFT ownership is transferred to the farmer. All these transactions take place over the blockchain based platform. The marketplace transaction system also provides a mechanism for feedback, ratings, and dispute resolution, ensuring transparency and a trusted environment for all marketplace participants. Various transactions which are possible using this marketplace transaction system include auction and bidding, leasing and renting, embryo exchange, consignment sale, future contracts, option contracts.

The marketplace transaction system 312 support auction-style transactions where sellers can list embryo NFTs for bidding, and buyers can participate in competitive bidding to acquire the embryos. This can create a dynamic and competitive marketplace environment. Further, the marketplace transaction system can incorporate an embryo exchange feature that allows buyers and sellers to directly trade or exchange their existing embryo NFTs with one another. This can provide flexibility for breeders to optimize their breeding programs and acquire embryos of interest. In an embodiment, breeders or genetic companies may wish to offer their embryo NFTs for sale through a consignment model. The marketplace transaction system can support this type of transaction, where the seller retains ownership of the embryos until a buyer is found, upon which the ownership is transferred. Also, the marketplace transaction system can introduce futures contracts for embryo NFTs, allowing buyers and sellers to enter into agreements to buy or sell embryos at a predetermined price and future date. This enables breeders to hedge against price fluctuations and provides a mechanism for speculators to participate in the market. The marketplace transaction system can support options contracts, giving buyers the right to buy or sell embryo NFTs at a specified price within a defined time period. This allows for more advanced trading strategies and risk management. These additional transaction types can enhance the versatility and flexibility of the marketplace, catering to a wider range of buyer and seller needs in the embryo trading ecosystem. Moreover, by incorporating features inspired by stock markets and financial markets, the marketplace transaction system for embryo NFTs can attract a broader range of participants and accommodate advanced trading strategies.

The embodiments of present disclosure herein address unresolved problem of uniquely identifying livestock embryos and tracking them authentically for their ownership and all the associated details about the donor male, female, their lineage and/or the like. The present disclosure leverages blockchain technology to create unique digital assets representing the physical livestock embryos and identified by a unique token. By utilizing smart contracts on a blockchain platform, secure creation, transfer, and ownership tracking of livestock embryo NFTs is enabled. Further, a machine learning based approach for personalized recommendation of the livestock embryos with associated costs to the user based on the available NFT data, domain knowledge about the breeding policy and needs of the user is provided. A marketplace transaction system for fair trading of the livestock embryo NFTs is disclosed.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein by the following claims.

What is claimed is:

1. A processor implemented method of personalized recommendation and transaction of non-fungible token (NFT) of a plurality of livestock embryos, comprising:

acquiring, via one or more hardware processors, a plurality of metadata associated with each of a specific livestock embryo from the plurality of livestock embryos, wherein the plurality of metadata comprises genetic traits associated with genetic markers, cryogenic storage parameters, donor lineage data, and environmental sensor data;

generating, by the one or more hardware processors of a digital embryo asset server, an equivalent digital replica of each livestock embryo, based on the plurality of metadata, and information associated with a physical livestock embryo from the plurality of metadata stored in a central database is transformed into the equivalent digital replica of each livestock embryo;

creating, via the one or more hardware processors, the NFT from a plurality of NFTs for each of the specific livestock embryo from the plurality of livestock embryos over a blockchain based platform, by the generated equivalent digital replica using the plurality of metadata of the plurality of livestock embryos, wherein each NFT is cryptographically bound to a physical embryo identifier;

generating, via the one or more hardware processors, a smart contract in a blockchain network defining a logic and functionality of the created NFT for each of the specific livestock embryo, a plurality of rules and conditions of ownership and one or more transactions associated with the plurality of NFTs for recording one or more new NFTs, transferring ownership, and managing associated data;

generating, via the one or more e hardware processors, personalized recommendations for the plurality of NFTs of the plurality of livestock embryos to the one or more users, wherein the personalized recommendations are generated by using a machine learning based reinforcement (RF) model, wherein the machine learning based reinforcement (RF) model is trained using a database on the plurality of NFTs, one or more policies of breeding, a domain knowledge on the plurality of livestock embryos, and one or more user preferences;

enabling, via the one or more hardware processors, a plurality of transactions for a fair trading of the plurality of livestock embryos using a marketplace transaction system based on the generated personalized recommendations; and tracking, via the one or more hardware processors, the generated personalized recommendations to obtain feedback on success or failure associated with the generated personalized recommendations, wherein the machine learning RF model is iteratively updated in accordance with the feedback from completed embryo transfer events, and adapt the generated personalized recommendations.

2. The processor implemented method of claim 1, wherein the generated smart contract ensures security, authenticity, and enforceability of the plurality of NFTs on the blockchain network.

3. The processor implemented method of claim 1, wherein the machine learning based reinforcement learning (RF) model generates personalized recommendations by:

predicting a breeding outcomes for each available livestock embryo from the plurality of livestock embryos;

assigning a rank to each available livestock embryo from the plurality of livestock embryos based on the predicted breeding outcomes with most favorable livestock embryos given higher rankings; and generating personalized recommendations for the plurality of livestock embryos based on the rank.

4. The processor implemented method of claim 1, wherein the plurality of transactions enabled by the marketplace transaction system for the plurality of livestock embryos include at least one of (i) an auction, (ii) exchange of the plurality of livestock embryos, (iii) consignment sales, (iv) future contracts, and (v) options contracts.

5. The processor implemented method of claim 1, wherein the plurality of transactions enabled by the marketplace transaction system for the plurality of livestock embryos ensure (i) flexibility due to preservation of the plurality of livestock embryos for longer duration using cryogenics process, and (ii) matchmaking for selling to include one or more schemes and constrained selling.

6. A system for personalized recommendation and transaction of non-fungible token (NFT) of a plurality of livestock embryos, comprising:

a memory storing instructions;

one or more communication interfaces; and one or more hardware processors coupled to the memory via the one or more communication interfaces, wherein the one or more hardware processors are configured by the instructions to:

acquire a plurality of metadata associated with each of a specific livestock embryo from the plurality of livestock embryos, wherein the plurality of metadata comprises genetic traits associated with genetic markers, cryogenic storage parameters, donor lineage data, and environmental sensor data;

generate, by a digital embryo asset server, an equivalent digital replica of each livestock embryo, based on the plurality of metadata, and information associated with a physical livestock embryo from the plurality of metadata stored in a central database is transformed into the equivalent digital replica of each livestock embryo;

create the NFT from a plurality of NFTs for each of the specific livestock embryo from the plurality of livestock embryos over a blockchain based platform, by the generated equivalent digital replica using the plurality of metadata of the plurality of livestock embryos, wherein each NET is cryptographically bound to a physical embryo identifier;

generate a smart contract in a blockchain network defining a logic and functionality of the created NFT for each of the specific livestock embryo, a plurality of rules and conditions of ownership and one or more transactions associated with the plurality of NFTs for recording one or more new NFTs, transferring ownership, and managing associated data;

generate personalized recommendations for the plurality of NFTs of the plurality of livestock embryos to the one or more users, wherein the personalized recommendations are generated by using a machine learning based reinforcement learning (RF) model, wherein the machine learning based reinforcement learning (RF) model is trained using a database on the plurality of NFTs, one or more policies of breeding, a domain knowledge on the plurality of livestock embryos, and one or more user preferences;

enable a plurality of transactions for a fair trading of the plurality of livestock embryos using a marketplace transaction system based on the generated personalized recommendations; and track the generated personalized recommendations to obtain feedback on success or failure associated with the generated personalized recommendations, wherein the machine learning RF model is iteratively updated in accordance with the feedback from completed embryo transfer events, and adapt the generated personalized recommendations.

7. The system of claim 6, wherein the generated smart contract ensures security, authenticity, and enforceability of the plurality of NFTs on the blockchain network.

8. The system of claim 6, wherein the machine learning based reinforcement learning (RF) model generates personalized recommendations by:

predicting a breeding outcomes for each available livestock embryo from the plurality of livestock embryos;

assigning a rank to each available livestock embryo from the plurality of livestock embryos based on the predicted breeding outcomes with most favorable livestock embryos given higher rankings; and generating personalized recommendations for the plurality of livestock embryos based on the rank.

9. The system of claim 6, wherein the plurality of transactions enabled by the marketplace transaction system for the plurality of livestock embryos include at least one of (i) an auction, (ii) exchange of the plurality of livestock embryos, (iii) consignment sales, (iv) future contracts, and (v) options contracts.

10. The system of claim 6, wherein the plurality of transactions enabled by the marketplace transaction system for the plurality of livestock embryos ensure (i) flexibility due to preservation of the plurality of livestock embryos for longer duration using cryogenics process, and (ii) matchmaking for selling to include one or more schemes and constrained selling.

11. One or more non-transitory machine-readable information storage mediums comprising one or more instructions which when executed by one or more hardware processors cause:

acquiring a plurality of metadata associated with each of a specific livestock embryo from a plurality of livestock embryos, wherein the plurality of metadata comprises genetic traits associated with genetic markers, cryogenic storage parameters, donor lineage data, and environmental sensor data;

generating, by a digital embryo asset server, an equivalent digital replica of each livestock embryo, based on the plurality of metadata, and information associated with a physical livestock embryo from the plurality of metadata stored in a central database is transformed into the equivalent digital replica of each livestock embryo;

creating a Non-Fungible Token (NFT) from a plurality of NFTs for each of the specific livestock embryo from the plurality of livestock embryos over a blockchain based platform, by the generated equivalent digital replica using the plurality of metadata of the plurality of livestock embryos, wherein each NFT is cryptographically bound to a physical embryo identifier;

generating a smart contract in a blockchain network defining a logic and functionality of the created NFT for each of the specific livestock embryo, a plurality of rules and conditions of ownership and one or more transactions associated with the plurality of NFTs for recording one or more new NFTs, transferring ownership, and managing associated data;

generating personalized recommendations for the plurality of NFTs of the plurality of livestock embryos to the one or more users, wherein the personalized recommendations are generated by using a machine learning based reinforcement (RF) model, wherein the machine learning based reinforcement (RF) model is trained using a database on the plurality of NFTs, one or more policies of breeding, a domain knowledge on the plurality of livestock embryos, and one or more user preferences;

enabling a plurality of transactions for a fair trading of the plurality of livestock embryos using a marketplace transaction system based on the generated personalized recommendations; and tracking the generated personalized recommendations to obtain feedback on success or failure associated with the generated personalized recommendations, wherein the machine learning RF model is iteratively updated in accordance with the feedback from completed embryo transfer events, and adapt the generated personalized recommendations.

12. The one or more non-transitory machine-readable information storage mediums of claim 11, wherein the generated smart contract ensures security, authenticity, and enforceability of the plurality of NFTs on the blockchain network.

13. The one or more non-transitory machine-readable information storage mediums of claim 11, wherein the machine learning based reinforcement learning (RF) model generates personalized recommendations by:

predicting a breeding outcomes for each available livestock embryo from the plurality of livestock embryos;

assigning a rank to each available livestock embryo from the plurality of livestock embryos based on the predicted breeding outcomes with most favorable livestock embryos given higher rankings; and generating personalized recommendations for the plurality of livestock embryos based on the rank.

14. The one or more non-transitory machine-readable information storage mediums of claim 11, wherein the plurality of transactions enabled by the marketplace transaction system for the plurality of livestock embryos include at least one of (i) an auction, (ii) exchange of the plurality of livestock embryos, (iii) consignment sales, (iv) future contracts, and (v) options contracts.

15. The one or more non-transitory machine-readable information storage mediums of claim 11, wherein the plurality of transactions enabled by the marketplace transaction system for the plurality of livestock embryos ensure (i) flexibility due to preservation of the plurality of livestock embryos for longer duration using cryogenics process, and (ii) matchmaking for selling to include one or more schemes and constrained selling.

* * * * *